Oct. 14, 1952  J. ESLINGER  2,613,470
ARTIFICIAL FISH BAIT
Filed Feb. 18, 1948
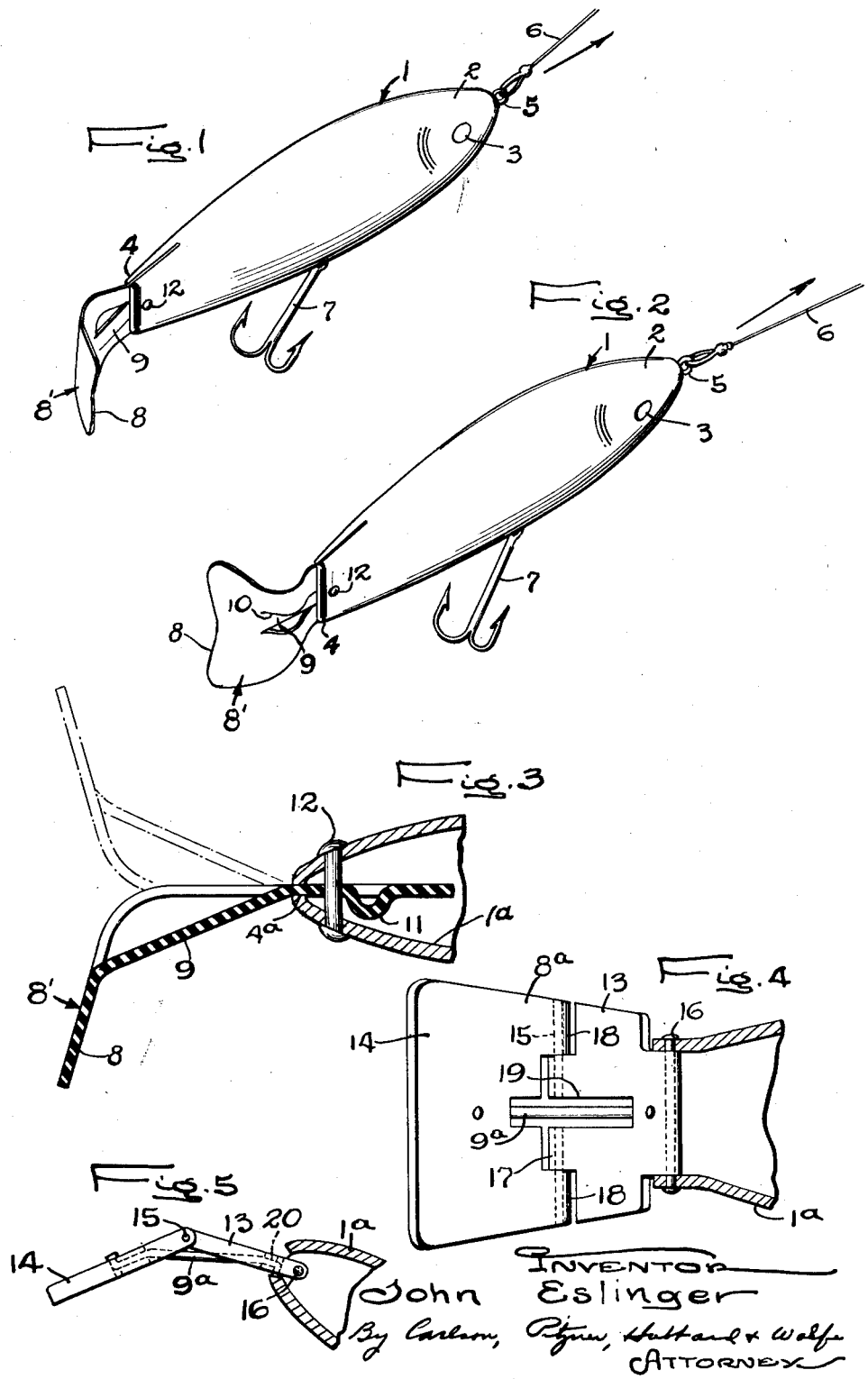

Patented Oct. 14, 1952

2,613,470

UNITED STATES PATENT OFFICE 2,613,470

ARTIFICIAL FISH BAIT

John Eslinger, Chicago, Ill.

Application February 18, 1948, Serial No. 9,120

4 Claims. (Cl. 43—42.03)

The present invention relates to improvements in artificial fish bait, particularly of the plug type.

A general object is to provide an artificial fish bait in the form of a plug having new and improved means for causing the bait when drawn through the water to simulate closely the swimming motion of a natural fish.

Another object is to provide an artificial fish bait having a flexible tail section which through coaction with the water will oscillate from side to side to simulate the action of a natural fish tail and to impart a wobble to the bait.

A further and more specific object is to provide an artificial fish bait with a flexible or articulated tail fin which is caused to move reversibly from one side to the other by the pressure of the water through the medium of an over-center load-and-release arrangement.

Other objects and advantages will become apparent as the description proceeds.

In the accompanying drawings,

Figure 1 is a perspective view of a fish bait embodying features of the present invention, the tail section being shown in extreme position at one side thereof.

Fig. 2 is a view similar to Fig. 1, but showing the tail section in extreme position at the other side of the bait.

Fig. 3 is an enlarged fragmentary sectional view of the tail section and its mounting.

Fig. 4 is a fragmentary side view of a modified form of the tail end of a bait or lure also embodying features of the invention.

Fig. 5 is a fragmentary plan view of the bait shown in Fig. 4.

Referring more particularly to the drawings, the fish bait of Figs. 1 to 3, constituting one preferred embodiment of the invention, comprises a body 1 in the form of a plug. The body 1 may be of any desired shape or character, and made of any suitable material and coloring. In the present instance, it is shown in the general form of the stream-lined body of a natural fish, having a head 2 with eyes 3, and tapering from the mid-section toward the rear end to a substantially flat vertical edge 4. A suitable eye 5 is secured to the head end for attachment of a line 6. Hooks of any conventional type and number, such as the hook 7, may be pivotally connected to the underside of the body 1.

Attached to the rear end of the body 1 is a movable tail section 8' including a fin 8 capable of flapping action reversibly from one side to the other of the longitudinal medial plane, and thus simulating the movement of the tail of a natural fish when swimming. The tail fin 8 may be made of any suitable material, and preferably is shaped like a natural tail fin. In the form of Figs. 1 to 3, the tail fin 8 is made of a thin sheet of resilient rubber which at the forward end is inserted into and tightly gripped by the side edges of a vertical slot 4a formed medially in the rear end edge of the body 1.

One of the important features of the present invention resides in the provision in the tail section of over-center load-and-release means whereby the tail section is caused to oscillate rapidly from side to side by the pressure of the water as the bait is drawn therethrough. This means may comprise any suitable resilient element which is adapted to be extended out of normal condition when the tail fin is located in the longitudinal medial plane of the body 1, i. e. in the center position, and which will exert a lateral outward pull on the tail fin when located at either side of the center position. Thus, the resilient element may comprise a narrow medial strip of rubber 9 which in the present instance is formed by cutting two longitudinal parallel slits 10 in the forward end portion of the tail fin 8, and which is shortened relative to the tail fin in any suitable manner, for example, by taking up a portion thereof, as at 11, within the body 1. The forward end of the strip 9 is suitably anchored within the body 1 by means of a cross pin 12. Alternatively the shortened strip may be tightly clamped or pressure sealed between the edges of the slot-like opening in the rear end of the body 1. As a result, the rubber strip 9 will normally tend to flex the rear end portion of the tail fin 8 to one side or the other, and will be tensioned upon movement of the tail fin into center position.

In operation, the bait is drawn through the water. Assuming that the tail fin 8 is flexed into the full line position shown in Fig. 3, impact of the water thereon will move it against the tensile resistance of the resilient strip or band 9 toward and slightly over dead center position. Thereupon, the energy stored in the strip 9 will be released to flip the tail fin into the opposite flexed position indicated in dotted outline. This action will be repeated reversibly from side to side, thus closely simulating the natural action of a real fish tail. In each extreme position, the tail fin serves momentarily as a rudder to cause the bait to dart or swerve laterally in the corresponding direction, and as a consequence the periodic oscillation of the tail fin causes the bait to wobble from side to side as it moves forwardly.

In the modified form of the novel tail section shown in Fig. 4, the tail fin 8a is hinged for lateral oscillation, and preferably comprises a plurality of rigid articulated sections. More particularly, the tail 8a comprises forward and trailing sections 13 and 14 hinged together intermediately by means of two pivot pins 15, with the forward section extending loosely into a slot in the tail end of the body 1a and hinged therein on a pin 16. The intermediate hinge consists of central lugs 17 on the rear edge of the section 13 located between spaced lugs 18 on the front edge of the section 14, and through which interfitting lugs the pins 15 are inserted.

Deep medial aligned notches are formed in the adjacent edges of the tail fin sections 13 and 14 to define a longitudinal clearance slot 19 extending to opposite sides of the pins 15. An extensible resilient element, preferably in the form of an elastic or rubber band 9a, is suitably anchored at opposite ends in sockets or apertures 20 at opposite ends of the slot 19. This band is of such length that it will be extended out of normal position against its natural resiliency when the trailing tail fin section 14 is located in the plane of the section 13, and hence will tend to displace the section 14 to one side or the other of said plane. The slot 19 permits the band 9a to move back and forth therethrough as the section 14 is moved reversibly from one side to the other.

The operation is similar to that of the first form of the invention. The resilient band 9a defines an over-center load-and-release device. When the trailing tail section 14, is located at either side, impact of the water thereon will move it into and past dead center position. Thereupon, the band 9a will flip it to the other side, and in such action the leading tail fin section 13 will also be initially canted slightly in the same direction.

The tail fin sections 13 and 14 may advantageously be made of a molded thermoplastic material, either glass white or colored. The body 1 or 1a may be formed of similar material. Such thermoplastic material can be readily shaped and compressed when hot to anchor the tail section of the first form of the invention in the body 1 and the band 9a of the modified embodiment of the invention in the tail bin sections 13 and 14.

It will be evident that I have provided a new and improved artificial fish bait with a unique and effective flexible or articulated tail section which will oscillate back and forth as an incident to the movement of the bait through the water in a manner closely simulating the tail action of a natural fish when swimming. The bait has not only a most alluring action and appearance, but is both simple and inexpensive in construction.

I claim:

1. A fish bait comprising, in combination, an elongated plug body adapted to be drawn endwise through the water, a tail section comprising a tail fin interconnected with the rear end of said body and capable of movement reversibly into the path of the slip stream of water at opposite sides of said body, said tail fin when located at either side of said body being movable by the action of the water toward and over dead center position, and an elongated elastic member connected at one end with said body and at the other end with said movable fin, said elastic member when unstressed being shorter in length than the spacing between said body and said fin when said tail is in dead center position, and said member being tensioned upon movement of said fin from either side of said body toward dead center and serving upon movement of said tail fin past dead center position to flip said tail fin to the opposite side of said body for play thereon of said slip stream.

2. A fish bait comprising, in combination, an elongated plug body adapted to be drawn endwise through the water, a tail section connected directly to the rear end of said body and comprising a tail fin capable of movement reversibly into the path of the slip stream of water at opposite sides of said body, said tail fin when located at either side of said body being movable by the action of the water toward and over dead center position, and a longitudinal resilient member connected at its rear end with a medial portion of said fin and connected at its forward end to a portion of said body forward of the junction of the rear end of said member with said fin; said member, when unstressed, being shorter in length than the distance between the junctures of opposite ends of said member with said body and said fin when said tail fin is in dead center position; said member being operable to store tension energy upon movement of said tail fin into dead center position and operable upon movement of said tail fin from either side of said body past dead center position to flip said tail fin to the opposite side of said body for play thereon of said slip stream.

3. A fish bait comprising, in combination, an elongated plug body adapted to be drawn endwise through the water, a flexible tail section on the rear end of said body comprising a tail fin secured directly to said body and capable of movement reversibly into the path of the slip stream of water at opposite sides of said body, said tail fin when located at either side of said body being movable by the action of the water toward and over dead center position, and a resilient tensile intermediate element in said section anchored to said body and the rear portion of said tail fin and operable upon movement of said tail fin from either side of said body past dead center position to flip said tail to the opposite side of said body for play thereon of said slip stream, said element being movable from one side to the other of said tail as said tail is oscillated from side to side.

4. A fish bait comprising, in combination, an elongated plug body adapted to be drawn endwise through the water, a tail section comprising a flexible rubber tail fin secured directly to the rear end of said body and capable of movement reversibly into the path of the slip stream of water at opposite sides of said body, said tail fin when located at either side of said body being movable by the action of the water toward and over dead center position, said section including a resilient rubber band connected to said tail fin and anchored in said body under tension when said tail fin is located in dead center position, and operable upon movement of said tail fin from either side of said body past dead center position to flip said tail fin to the opposite side of said body for play thereon of said slip stream.

JOHN ESLINGER.

REFERENCES CITED

The following references are of record in the file of this patent:

UNITED STATES PATENTS

| Number | Name | Date |
|---|---|---|
| 1,485,643 | Streich | Mar. 4, 1924 |
| 2,150,846 | Rayburn | Mar. 14, 1939 |
| 2,183,059 | Bacon | Dec. 12, 1939 |